Oct. 30, 1962 A. G. KOZACKA 3,060,466
CONTROLS FOR TURRET LATHES AND THE LIKE
Filed Jan. 30, 1958 4 Sheets-Sheet 2
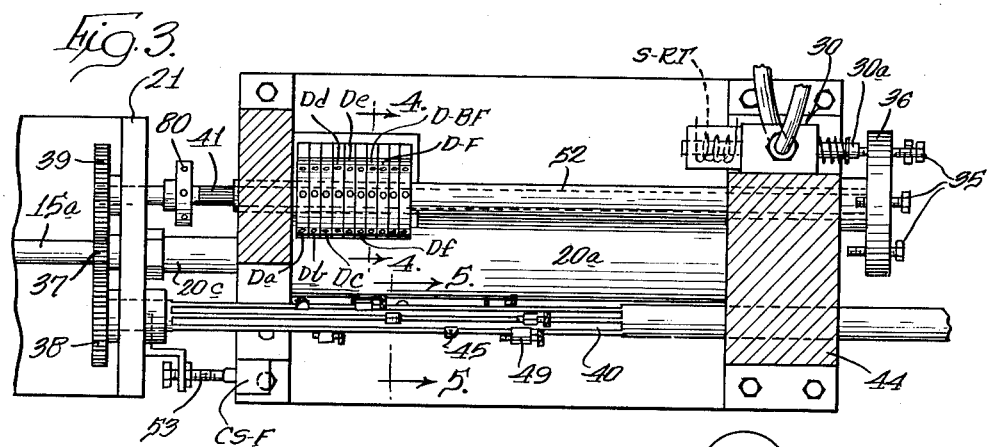
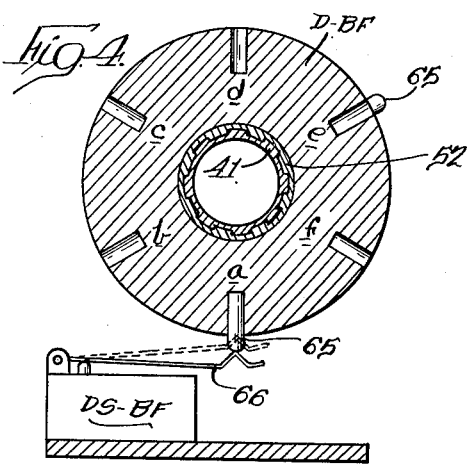
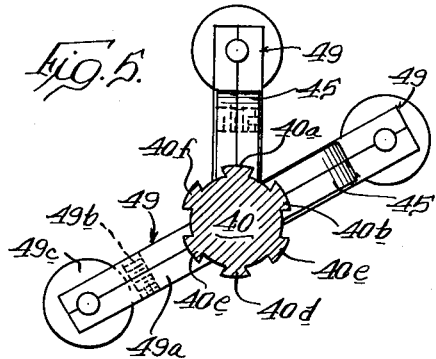
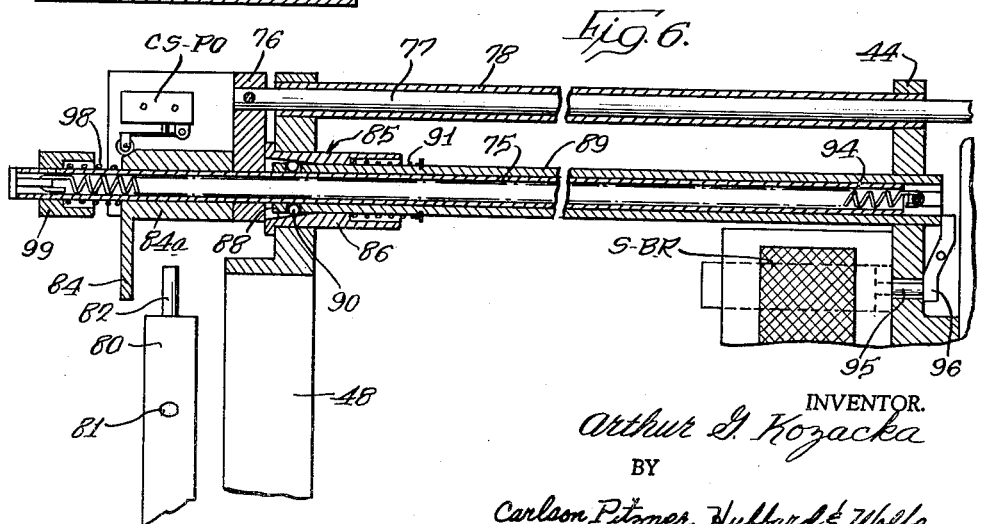
INVENTOR.
Arthur G. Kozacka
BY
Carlson, Pitzner, Hubbard & Wolfe
Attys.

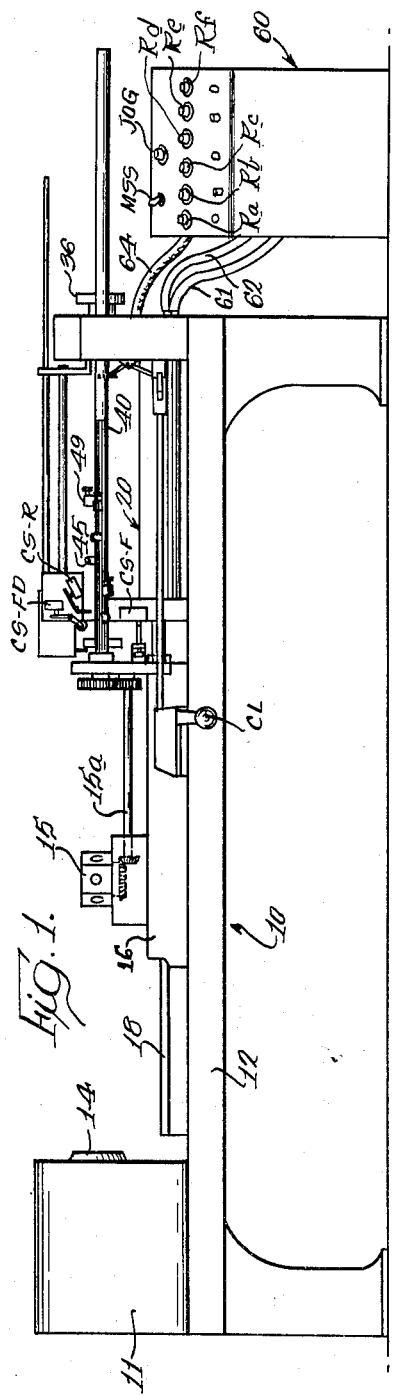

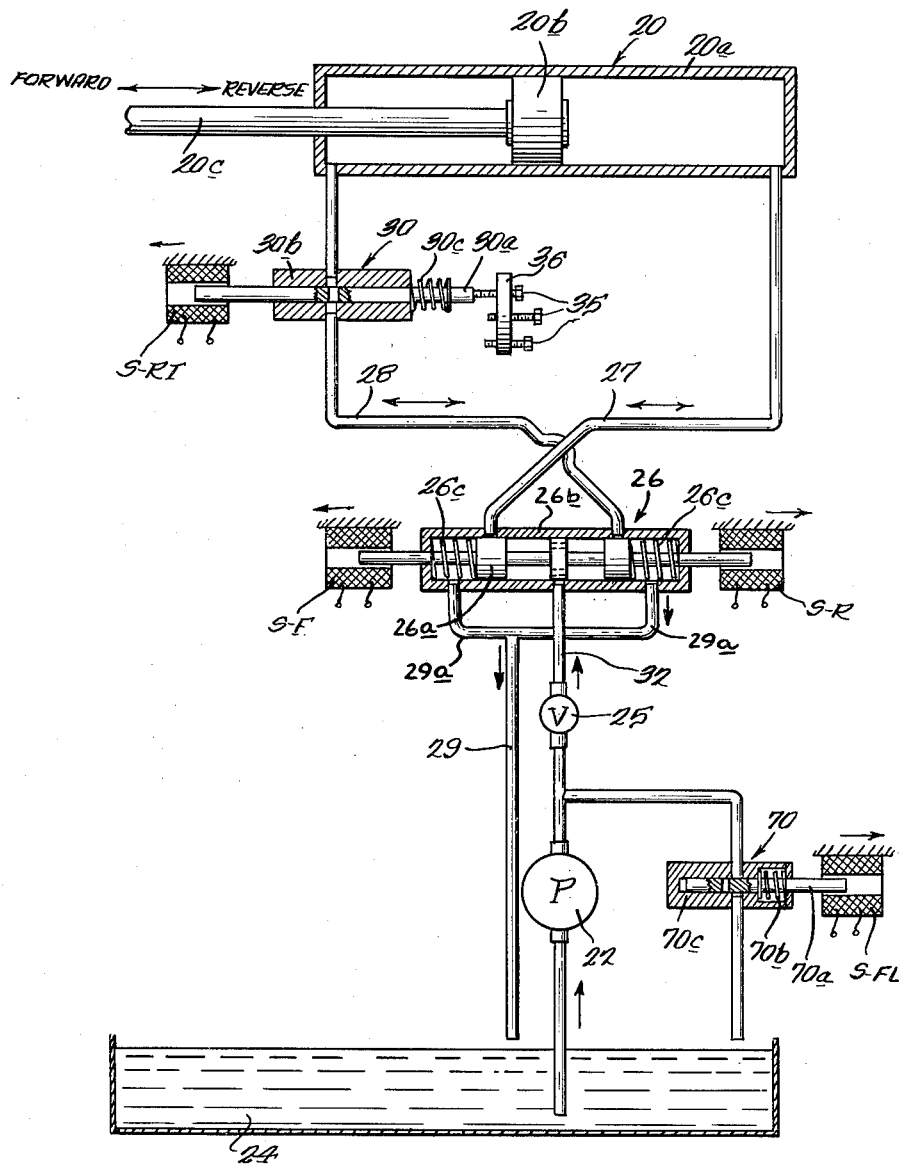

INVENTOR.
Arthur G. Kozacka
BY
Carlson, Pitzner, Hubbard & Wolfe
Attys.

United States Patent Office 3,060,466
Patented Oct. 30, 1962

3,060,466
CONTROLS FOR TURRET LATHES AND
THE LIKE
Arthur G. Kozacka, Chicago, Ill., assignor to Acme Industrial Company, Chicago, Ill., a corporation of Illinois
Filed Jan. 30, 1958, Ser. No. 712,263
14 Claims. (Cl. 10—128)

The present invention relates in general to machine tools, and to the control of reciprocatable machine tool elements. More particularly, the invention has to do with controlling the motions of reciprocatable, rotationally indexable machine tool elements, such as the turret of a turret lathe.

So-called "automatic" control systems for lathe turrets have long been known and have taken a variety of forms. Such prior systems have been limited, however, to carrying out a limited number of different operational cycles, and have been complex in organization and inconvenient in set-up to accomplish a certain cycle when the turret is at a selected station. In short, prior systems have not been fully automatic in that they could not automatically bring about any selected one of a large plurality of different operational cycles when the turret is in any of its several indexed stations.

The general aim of this invention is to bring forth an improved system for controlling the motions of a lathe turret or the like, a system which affords pre-programming or preselection of any one of a fairly large number of operational cycles to take place when the turret is at any one of its indexed stations.

Another object of the invention is to provide such a system which is relatively simple in its organization, and in which the control components for bringing about one type of operational cycle are utilized by modifying interconnections to effect other cycles of operation.

It is a further object of this invention to provide a lathe turret control which can produce the usual standard cycle of turret movement, yet in which a "dwell" period may be individually adjusted and preselected for each station of the turret.

Still another object is to provide a control system which can produce either a standard operational cycle or a backfeeding cycle at any turret station, and in which the rate of backfeed is equal to the rate of forward speed which is individually preselected for each turret station.

An additional object of the invention is to make it possible to obtain a "floating" cycle of turret movement for thread-cutting operations when the turret is in any preselected one of its stations. In this connection, it is an objective to simplify the controls for producing floating action, and to provide optional "float-in" or "float-in-and-out" action.

Further, it is an object to create a lathe turret control system which provides a standard cycle of turret movement, and yet which also provides at preselectable turret stations for successive reciprocatory feed of the turret for deep hole drilling.

Other objects and advantagees will become apparent as the following description proceeds, taken in conjunction with the accompanying drawings, in which:

FIGURE 1 is a front elevation of a turret lathe equipped with a control system embodying the features of the present invention;

FIG. 2 is an enlarged elevation corresponding to a part of FIG. 1;

FIG. 3 is a plan view, taken partly in section substantially along the line 3—3 in FIG. 2;

FIG. 4 is a detail view in section, taken substantially along the line 4—4 in FIG. 3;

FIG. 5 is a detail view in section, taken substantially along the line 5—5 in FIG. 3 and showing the arrangement of traverse and feed control dogs;

FIG. 6 is a vertical sectional view of a part of the apparatus employed to produce a reciprocating drilling cycle of turret movement;

FIG. 7 is a schematic diagram of the hydraulic circuits of the control system;

Figure 8:
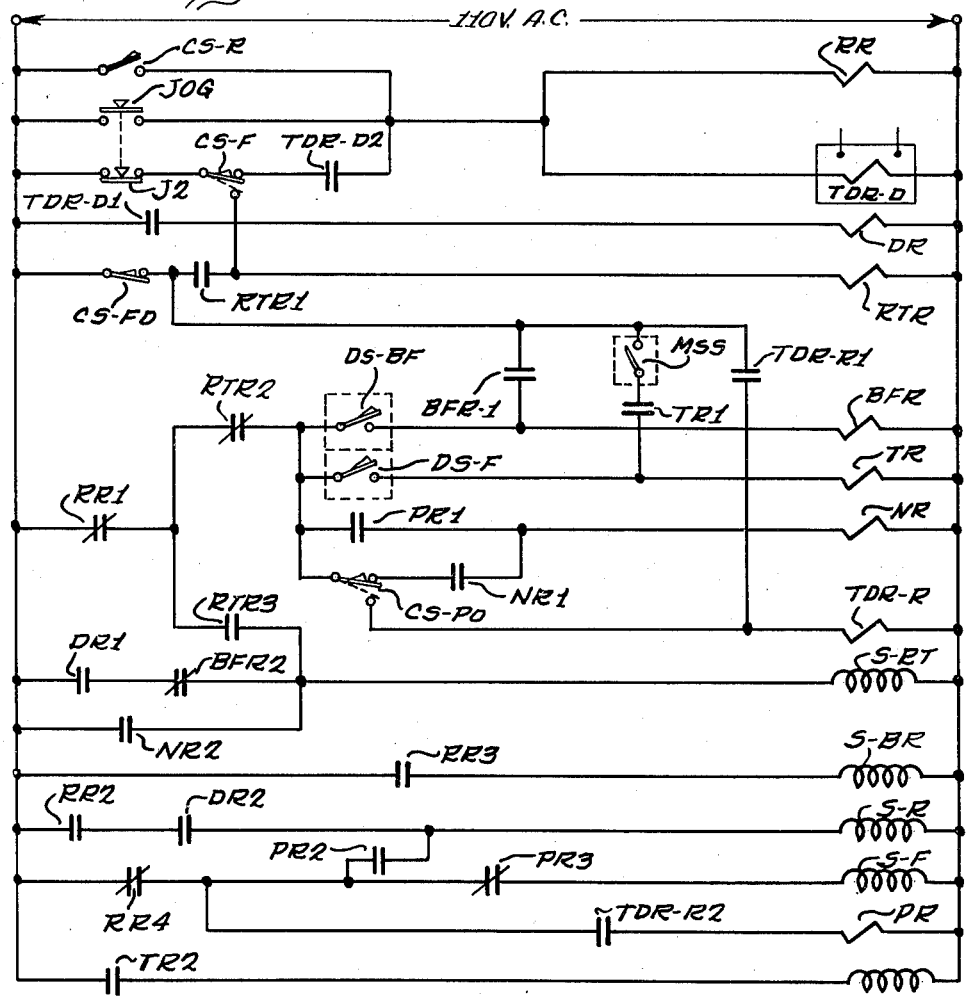
FIG. 8 is a schematic diagram of the electrical circuits of the control system.

While the invention has been shown and will be described in some detail with reference to a particular embodiment, there is no intention that it thus be limited to such detail. On the contrary, it is intended here to cover all alterations, modifications, and equivalents falling within the spirit and scope of the invention as defined by the appended claims.

Referring now to the drawings, the invention has been shown by way of example as applied to a turret lathe 10 (FIG. 1) which includes the usual headstock 11 mounted at one end of a bed 12 and supporting a rotatable work-holding chuck 14. The lathe also has a turret 15 movable along a linear path, that turret being here shown as mounted on a slide 16 which slides along ways 18 formed on the bed 12.

The turret 15 as here illustrated is rotatable about a vertical axis relative to the slide 16, and provided with a plurality of angularly spaced, socketed faces for receiving various types of cutting tools. For example, the turret 15 may have six socketed faces therearound and may receive drills, boring cutters, reamers, thread-cutting dies, or similar tools in its sockets for performing different machining operations successively on a single workpiece held in the chuck 14.

To rotationally index the turret 15, and thus bring its faces successively into alinement opposite the chuck 14, the slide 16 includes a conventional indexing mechanism, which is not illustrated in detail. Such indexing mechanisms are well known to those skilled in the art and operate to index the turret 15 to its next rotational station as an incident to the turret and slide 16 being fully retracted away from the chuck 14. It will be sufficient to note here simply that the turret has a shaft 15a projecting therefrom which is so connected with the indexing mechanism that it rotates in step with the turret 15 when the latter is indexed from one station to the next.

For advancing the turret 15 forwardly toward the chuck 14 or retracting the turret rearwardly away from the chuck, reversible power means are utilized. In the form here illustrated, such reversible power means is constituted by a double-acting hydraulic actuator 20 which includes a cylinder 20a mounted at the right end of the bed 12, and a piston 20b slidable within that cylinder (FIG 7). A piston rod 20c is rigidly connected at its left end with a yoke 21 fixed to the slide 16, so that as the piston 20b moves forwardly and rearwardly, the slide and the turret thereon are correspondingly advanced and retracted along the bed 12.

For supplying energy to the reversible hydraulic actuator 20, a source of fluid pressure in the form of a constant pressure pump 22 is employed as illustrated in FIG. 7, this pump being suitably driven by an electric motor or the like (not shown). The manner in which the admission and venting of fluid to and from the actuator 20 is controlled will be discussed in greater detail below; for the present it will be sufficient to note only that the pump 22 takes fluid, such as oil, from a sump 24 and supplies it under pressure through a main shut-off valve 25 to a solenoid controlled direction-controlling valve 26. Fluid can pass to or from the opposite ends of the cylinder 20a through conduits 27 and 28, such fluid flowing under pressure from the pump 22 or returning to the sump 24 through a line 29. Connected in the line 28 is a rate valve 30 which by varying the size of the orifice or restriction which it presents, determines the speed or rate at which the piston 20b moves for a given output pressure from the pump 22.

*Controls and Operation for Standard Cycle*

For the normal or standard cycle of turret movement, it is desired to advance the turret 15 forwardly toward the work in the chuck 14 at a rapid traverse rate in order to minimize the time required to bring the cutter tool into engagement with the workpiece. After the turret has advanced rapidly through a first predetermined distance to present the cutter tool to the workpiece, it is then desired to move the turret forwardly for a second predetermined distance at a relatively slow or feed rate during the actual cutting engagement of the tool with the workpiece. When the turret reaches the end of this second predetermined distance, i.e., when the cutter tool carried by the turret reaches the end of the surface it is to act upon, then it is desired to reverse the motion of the turret and move it rapidly to its fully retracted or home position. This retraction causes the indexing mechanism to rotationally advance the turret 15 to its next station, presenting the next cutting tool thereon in operative position to engage the workpiece when the turret is advanced again.

To bring about such a standard cycle of turret movement, the reversing valve 26 (FIG. 7) is employed to control the direction of turret movement. This valve includes a plunger 26a having three lands movable within a valve casing 26b and centered by means such as compression springs 26c. With the plunger centered, the valve ports connecting with a pressure conduit 32 and the actuator conduits 27 and 28 are shut off. Accordingly, the piston 20b and the turret 15 are hydraulically locked against movement. Associated with the plunger 26a are two solenoids, a forward solenoid S–F and a reverse solenoid S–R. When solenoid S–F is energized to shift the plunger 26a to the left, then the lands on the plunger move so that pressure fluid flows from the line 32 through holes in the center land to the line 27, supplying fluid pressure to the right end of the cylinder 20a. At the same time, the plunger lands place the line 28 in communication with venting conduits 29a and 29, so that fluid can pass from the left end of the cylinder 20a back to the sump 24. Under these conditions, the piston 20b and the turret 15 will advance forwardly, i.e., toward the work-holding chuck 14.

On the other hand, when the reversing solenoid S–R is energized to shift the plunger 26a to the right, then the plunger lands will place the lines 32 and 28 in communication so that fluid under pressure flows from the pump 22 to the left end of the cylinder 20a. Correspondingly, the lands on the plunger 26a place the lines 27 and 29a in communication so that fluid can pass from the right end of the cylinder 28 to the sump 24. Under these conditions, the piston 20b and the turret 15 will move rearwardly, i.e., away from the work-holding chuck 14.

As previously noted, the rate valve 30 is used to control the speed with which the piston 20b and the turret 15 move. As shown in FIG. 7, the rate valve includes a plunger 30a shiftable in a valve body 30b. The plunger has an orifice therein which may be alined to different degrees with body ports connected in the conduit 28. The position of the plunger 30a and the degree to which the orifice in that plunger alines with the ports in the casing 30b, determines the restriction presented to fluid flow through the line 28. This, in turn, determines the speed with which the piston 20b moves for a given output pressure supplied by the pump 22.

The valve 30 is normally held in a wide-open condition by energization of an associated solenoid S–RT which shifts the valve plunger 30a to the left against the biasing force of a compression spring 30c. Thus, when the solenoid S–RT is energized, the valve 30 presents substantially no restriction in line 28 and the piston 20b moves at a rapid traverse rate. However, when the solenoid S–RT is de-energized, then the spring 30c urges the plunger 30a to the right (FIG. 7), its position being determined by one of a plurality of stop screws 35 carried by a rotatable disk 36. Since this partially closes down the restriction afforded by the valve 30, the piston 20b then moves at a slower, feed rate. The exact value of this feed rate is dependent upon the position of the plunger 30a, and in turn is dependent upon the axial adjustment of the particular stop screw 35 which is then engaged by the plunger.

In the arrangement illustrated by the drawings, provision is made to select individually for each station of the turret the first predetermined distance through which the turret will advance at a traverse rate, the second predetermined difference through which it will advance at a feed rate before reversing, and the value or magnitude of that feed rate. To accomplish this, the right end of the indexed turret shaft 15a is journaled in the yoke 21 (FIG. 2) and carries a gear 37 meshed with a pair of gears 38 and 39 (FIG. 3). The latter gears are mounted on shafts 40 and 41 which are also journaled in the yoke 21. It will be apparent, therefore, that as the turret and its shaft 15a are successively rotated in steps for indexing, the shafts 40 and 41 will likewise be rotationally indexed.

The shaft 40 is slidably supported at its right end (FIG. 3) in a bracket 44 fixed to the lathe bed, so that this shaft is not only rotationally indexed in step with the turret but also moves longitudinally therewith. As illustrated best in FIG. 5, the shaft 40 is provided with six angularly spaced ribs 40a–40f corresponding in their locations to the six angular stations of the turret 15. For controlling the first distance through which the turret advances at a traverse rate, each of these ribs receives a longitudinally adjustable dog 45 (FIG. 2) which is so sized and positioned when its mounting rib is in the uppermost position as to engage and deflect (as the shaft 40 moves longitudinally) a roller 46 connected by a suitable linkage to actuate a control switch CS–FD. This feed control switch, as will be later explained, serves when actuated to convert the velocity of turret movement from traverse rate to feed rate. And it will be readily apparent that the point at which forward traversing ends and forward feeding begins may be individually preselected for each of the several turret stations by adjusting the positions of the several dogs 45 lengthwise along the shaft 40. The feed control switch CS–FD is carried on the upper portion of a bracket 48 rigidly fixed to the lathe bed 12.

In a similar manner, the shaft 40 is provided with an axially adjustable dog 49 on each of its angularly spaced ribs. As shown best in FIG. 5, each dog 49 includes a split finger 49a adapted to be clamped to one of the shaft ribs by means of a screw 49b, and which carries at its upper end a threaded adjustable screw 49c. Thus, each of the dogs 49 may be bodily adjusted and then locked in its position lengthwise of the shaft 40, and the forward end of the screw 49c may be precisely adjusted to a desired position by turning that screw within the finger 49a. The forward or left ends of the screws 49c as viewed in FIG. 2 are so located as to engage a finger 50 (cleared by the dogs 45) as the turret advances to a predetermined point, that finger being connected to actuate a reversing control switch CS–R. This latter switch, as will be explained below, functions when actuated to reverse the direction of turret movement.

The shaft 41 (FIG. 3), which is indexed in step with the turret, is splined and is axially slidable within a hollow mating sleeve 52. The sleeve 52 is journaled in the brackets 44 and 48 and will thus be rotationally indexed in step with the turret while remaining axially stationary. To enable the individual selection of feed rates for each station of the turret, the disk 36 is mounted on the left end of the sleeve 52 (FIG. 3) and carries the several angularly spaced stop screws 35 so that a different one will be brought into alinement with the rate valve plunger 30a when the turret 15 is in successive ones of its stations. Thus, by axially threading or adjusting the several stop screws 35 relative to the disk 36, the position of the rate valve plunger 30a when the associated solenoid S–RT is de-energized may be preselected. Since the position of this plunger 30a determines the size of the restriction presented by the rate valve 30 in the line 28 (FIG. 7), the magnitude or value of the feed rate which obtains when the turret is in each of its stations may be preselected.

To aid in making the cycles of turret movement occur automatically in succession, a control switch CS–F is arranged to be actuated when the turret is in its home position, that switch being effective to initiate forward movement. As shown best in FIGS. 2 and 3, the switch CS–F is mounted on the bracket 48 opposite an adjustable actuating screw 53 carried by the yoke 21. The screw 53 engages and actuates the switch CS–F only when the turret 15 is in its fully retracted position.

The main shut-off valve 25, physically mounted in the bracket 44, may be opened by shifting a manual control lever CL and an associated link rod. The valve is held open by a latch (not shown) but may be closed at any time to stop movement of the turret by shifting the lever CL in the opposite direction.

With the foregoing in mind, the organization of the electrical control circuits to produce a standard cycle of turret movement may now be understood with reference to the following description of one operational sequence. Let it be assumed that the valve 25 has been latched open and that the turret 15, having substantially completed one cycle of movement, is traversing rearwardly but has not yet reached its fully retracted position. Under these conditions, the valve 30 (FIG. 7) is in its wide-open condition, and the valve 26 is in its reverse condition so that pressure fluid is being supplied to the left end of the cylinder 20a and is being returned from the right end of that piston to the sump 24.

Under these circumstances, a reverse relay having a coil RR (FIG. 8) will be energized and sealed in because the forward control switch CS–F and the time delay relay contacts TDR–D1 and TDR–D2 will be closed, for a reason to be explained presently. A dwell relay DR will thus also be energized. The reverse relay RR2 will be closed, and the dwell relay contacts DR2 will also be closed to complete an energization circuit for the reversing solenoid S–R. With this solenoid energized, the direction valve 26 will be in its reverse condition, as previously explained. Further, the rate valve solenoid S–RT will be energized through closed dwell relay contacts DR1 and normally closed backfeed relay contacts BFR2.

Then, when the turret reaches its fully retracted position, the actuating pin 53 will trip the forward control switch CS–F. As a first result, actuation of the switch CS–F breaks the energizing circuit for the reverse relay RR (FIG. 8) and the time delay dwell relay TDR–D. Accordingly, the time delay dwell relay contacts TDR–D1 will open to de-energize the dwell relay DR. Thus, the three relays RR, TDR–D and DR are dropped out. The reverse relay and dwell relay contacts RR2 and DR2 both open so as to de-energize the solenoid S–R, taking the direction valve 26 out of its reverse condition.

Moreover, actuation of the forward control switch CS–F completes an energization circuit through the normally closed jog contacts J2 for the coil RTR of a rapid traverse relay. This latter relay thus picks up and seals in through its own contacts RTR1 and the normally closed control switch CS–FD.

It will, therefore, be apparent that the normally closed reverse relay contacts RR1 are reclosed by the de-energization of the relay RR, and the normally open rapid traverse relay contacts RTR3 are closed by the energization of the relay RTR. Thus, even though the contacts DR1 open in response to de-energization of the coil DR, an energizing path is maintained through the contacts RR1 and RTR3 for the rate valve solenoid S–RT. The latter remains energized and the valve 30 remains in its wide-open condition so that further movements of the turret will take place at traverse rates.

Finally, when the reverse relay RR was de-energized, its own normally closed contacts RR4 reclosed, thus creating an energization path through the normally closed relay contacts PR3 for the forward solenoid SF of the direction controlling valve 26. This latter valve is thus switched to its forward condition so that the turret then advances in a forward direction and at a traverse rate.

When the turret 15 has been traversed forwardly through a first predetermined distance determined by the setting of the particular dog 45 which corresponds to the station then occupied by the turret, that dog 45 will engage the roller 46 (FIG. 2) and actuate the feed control switch CS–FD. The normally closed contacts of this switch (FIG. 8) will therefore open, thus breaking the sealing circuit for the rapid traverse relay RTR and causing the latter to drop out. As a result, the rapid traverse relay contacts RTR3 re-open and de-energize the rate valve solenoid S–RT. The latter solenoid cannot be otherwise energized because the contacts DR1 are now open, as are the relay contacts NR2. With the de-energization of this solenoid S–RT, the biasing spring 30c (FIG. 7) shifts the rate valve plunger 30a to the right until it contacts the particular stop screw 35 alined therewith. A restriction of a size determined by the setting of that stop screw is thus inserted in the hydraulic line 28, making it more difficult for fluid to pass through that line from the left end of the cylinder 20a. Accordingly, the turret 15 then continues its forward movement but at a slower feed rate determined by the setting of the stop screw 35 engaged with the rate valve plunger 30a. It is at this point that the cutting tool carried by the turret engages the workpiece in the chuck 14 and begins the actual cutting operation.

When the turret has been advanced at a feed rate through a second predetermined distance for completion of the cutting operation, the tip of the screw 49c associated with the dog 49 carried in the uppermost position on the shaft 40 will strike and deflect the finger 50, thereby actuating the reversing control switch CS–R (FIG. 2). As shown in FIG. 8, actuation of this latter switch CS–R creates an energizing path for the reversing relay RR and the time delay dwell relay TDR–D. At this point, it will be assumed that the time delay dwell relay TDR–D has a timing cycle of zero seconds so that its contacts actuate in unison with those of the reversing relay RR.

In response to energization of the reversing relay RR, its normally closed contacts RR4 will open, and thus de-energize the forward solenoid S–F. Moreover, energization of the time delay dwell relay TDR–D results in closure of the contacts TDR–D1, completing an energization path for the dwell relay DR. With this, the dwell relay contacts DR2 in series with the now closed reversing relay contacts RR2 energize the reversing solenoid S–R, so that the valve 26 is set to its reverse condition. Further, pick-up of the dwell relay DR results in closure of the contacts DR1 so that the rate valve solenoid S–RT is energized to shift the valve 30 to its wide-open condition. Accordingly, the direction of the turrett is reversed so that it retracts, and the rate valve is moved to its wide-open condition so that the retraction proceeds at a traverse rate.

When the turret reaches its fully retracted position, the foregoing cycle of operation will repeat, the turret having been indexed to its next rotational station as an incident to the retraction thereof. Thus, the standard cycle of operation will repeat over and over with the turret being indexed between successive cycles. As an important feature, the distance of forward traversing is preselected or predetermined individually for each turret station by the setting of the several dogs 45 lengthwise along the shaft 40. In like manner, the distance of forward feeding movement of the turret is preselected or predetermined for each station thereof by the setting of the corresponding dogs 49 lengthwise of the shaft 40. Finally, the magnitude or value of the feed rate is preprogrammed for each turret station by the setting of the corresponding stop screws 35 carried by the indexed disk 36.

If it is desired to stop the operation of the lathe after the completion of the cycle of movement at any one or any combination of the turret stations, it is only necessary to insert a projection, such as a screw 55, into the corresponding tapped holes 56 which are angularly spaced about the shaft 40. If a screw 55 is located in one of these holes 56 so as to be brought to a predetermined angular position when the turret is at a particular one of its stations, that screw will, upon retraction of the turret, engage and deflect a lever 57 which trips the latch (not shown) to close the main shut-off valve 25. With the closure of this valve, it will be apparent from FIG. 7 that further movement of the turret will be terminated because no pressure fluid from the pump 22 can reach the hydraulic actuator 20.

At this point it will be appropriate to note that in the preferred embodiment of the invention, many of the control components for the present system can be mounted in a portable control cabinet 60 (FIG. 1). In the lower portion of this cabinet the fluid sump 24, the pump 22 and its driving motor, the reversing valve 26, and all of the various time delay and control relays mentioned in connection with FIG. 8 can be located. Connections from the components in the cabinet 60 can be made to the components mounted on the lathe 10 by detachable hydraulic lines 61 and 62, and by a multi-conductor cable 64 which carries the necessary wiring connections to the several control switches.

*Apparatus and Operation for Producing Dwelling Cycles*

In the foregoing description of the controls and their operation for producing a standard cycle of operation, it was assumed that the time delay relay TDR–D shown in FIG. 8 was set to provide a zero time delay so that there was no dwelling action. It is highly desirable in certain operations, however, for the tool carried by the turret to "dwell" at its greatest point of penetration for a predetermined period of time in order to clean up the bottom of the cut. The required duration of this dwell period depends upon the particular nature of the tool in use on any given station of the turret, and upon the material of the workpiece. In accordance with one feature of the invention, therefore, not only is provision made to cause the turret to dwell at its farthest point of advance, but provision is made to individually predetermine and adjust the duration of the dwell period from zero up to a fairly long time interval, e.g., 15 seconds, which will be obtained at each or any of the turret stations.

In order to make this possible, the time delay dwell relay TDR–D is selected to be of the type which utilizes an adjustable time period determining element. In the preferred form, this delay relay is a standard electronic type relay which utilizes a resistance-capacitance series circuit to measure off time intervals by the timed charging or discharging of the capacitor. Since such electronic time delay circuits utilizing resistance-capacitance circuits are well known to those skilled in the art, it will be sufficient here simply to indicate that the time period between the instant of energization of such a relay and the instant at which its contacts are actuated, depends upon the value of the resistance which is connected in series with a capacitor. To make it possible to individually adjust the duration of a dwell period which occurs when the turret is at each of its several indexed stations, a plurality of adjustable time-determining elements in the form of a plurality of adjustable resistors are successively connected operationally in the circuit of the electronic time delay relay.

Figure 9:
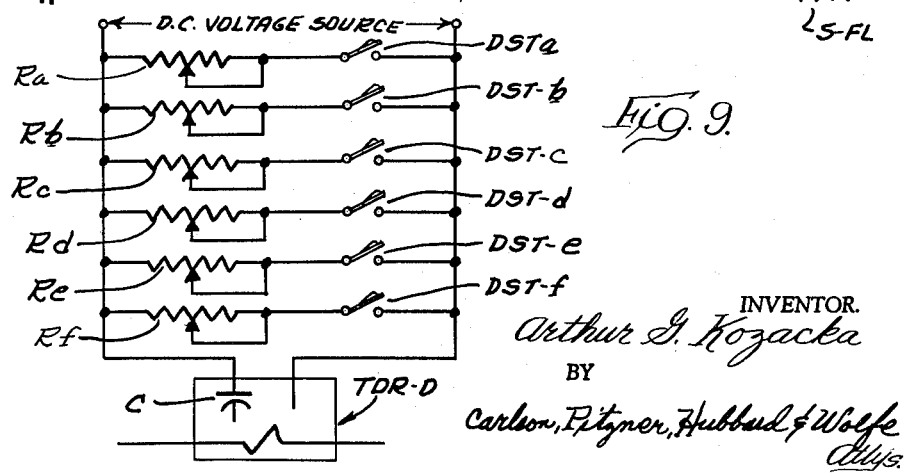
FIG. 9 is a schematic diagram of electrical connections for producing individually adjustable dwell periods at each turret station.

In the preferred arrangement, where the turret has six indexed stations, six separate adjustable resistors R$a$ through R$f$ are employed as illustrated in FIG. 9. Each of these resistors is connected in series with a corresponding one of six drum switches DST$a$ through DST$f$ across a suitable D.C. voltage source. A capacitor C within the time delay dwell relay TDR–D will, therefore, be connected in series with a particular one of the resistors R$a$ through R$f$ in response to closure of a corresponding one of the switches DST$a$ through DST$f$.

In order to actuate a particular one of the switches DST$a$ through DST$f$ when the turret 15 is in a corresponding one of its indexed positions, each of these switches is associated with a member which is rotationally indexed in step with the turret. Moreover, a projecting means is so disposed on the periphery of that indexed member as to actuate and close its switch when the turret is at a corresponding rotational station.

As illustrated in FIG. 3, the sleeve 52, axially stationary but rotationally indexed with the turret, is made to carry six disks D$a$ through D$f$, these disks being axially stacked together to form a composite drum. Each of these disks is provided with six angularly spaced openings adapted to receive means such as projecting dog screws or pins. The disk D$a$ is provided with one such projecting pin or screw which is arranged to actuate the switch DST$a$ when the turret is in its first rotational station (see FIG. 2). In a similar fashion, each of the disks D$b$ through D$f$ carries one dog or projection which is so disposed as to actuate the switches DST$b$ through DST$f$ when the turret is in its second through its sixth stations, respectively. Thus, it will be apparent that when the turret is at its fifth station, the timing switch DST$e$ shown in FIG. 9 will be closed to connect the adjustable resistor R$e$ in controlling circuit relation with the capacitor C of the electronic time delay dwell relay TDR–D. Since the resistor R$e$ can be individually adjusted as to its effective value, the operator of the turret lathe 10 can preselect in advance the duration of the dwell period which will take place when the turret is at its fifth station. The foregoing applies equally well to each of the other stations of the turret.

As shown particularly in FIG. 1, each of the dwell period-determining resistors R$a$ through R$f$ is mounted in the control cabinet 60 with an associated external knob so that the settings of these six resistors may be quickly and conveniently made by an operator to pre-program the dwell period (say from 0 to 15 seconds) which are desired at each of the six turret stations.

For an understanding of how the controls actually create a dwell period, reference may again be made to FIG. 8. It will be recalled from the preceding description of operation for a standard cycle of turret movement that the time delay relay TDR–D was de-energized when the turret reached a fully retracted position. As the turret then reversed its movement and began to traverse forwardly, the forward control switch CS–F was released by the pin 53, and thus deactuated. However, the reversing relay RR and the time delay relay TDR–D were not again energized because the contacts TDR–D2 were then open.

Now, when the turret reaches the end of its speeding movement through a second predetermined distance and the second dog 49 on the shaft 40 deflects the finger 50 to actuate the reversing control switch CS–R (FIG. 2), that switch is closed to energize (FIG. 8) the reversing RR and the coil of the time delay relay TDR–D. The reversing relay RR is thus picked up immediately, but the time delay dwell relay TDR–D will not actuate its contacts until after a predetermined interval determined by the setting of the particular one of the timing resistors which is then connected in circuit with the capacitor C by the disk switches DST*a* through DST*f*. Thus, actuation of the reversing relay contacts causes its normally closed contacts RR4 to open and de-energize the forward solenoid S–F. This results in centering of the reversing valve plunger 26a so that pressure fluid cannot pass therethrough. The piston 20b and the turret 15 thus come to a halt.

After the time delay dwell relay TDR–D times out, a period which is determined by the setting of the corresponding one of the resistors R*a* through R*f*, then its contacts will actuate. It is only then that the contacts TDR–D1 close to energize the dwell relay DR, and thus cause the contacts DR–2 to close and complete an energizing path for the reverse solenoid S–R of the valve 26. Thus, at the end of a predetermined "dwell" period, the valve 26 is set to its reverse condition and the turret begins its retracting motion. It will also be recalled that energization of the dwell relay DR results in closure of the contacts DR–1 to energize the rapid traverse solenoid S–RT, setting the rate valve 30 to its open position so that the turret proceeds rearwardly at a traverse rate.

*Controls and Operation for Backfeeding Cycles*

In most machine operations it is possible to feed the turret and the tool carried thereby slowly into the work, and then traverse them out of the work, as will be accomplished by the standard cycle of turret movement described above. However, in certain other machine operations, it is necessary to feed the tool into the work, feed the tool slowly back until it clears the work, and only then move the turret at rapid traverse in a reverse direction. For example, in boring operations, if the tool is traversed reversely out of the bore, the cutter will leave a spiral mark. To avoid this, the cutter is fed rearwardly out of the hole so that the cutting tool finishes the inner surface of the bore and leaves it unmarked.

In accordance with one feature of the present invention, provision is made to modify the controls previously described so that a backfeeding cycle of operation takes place when the turret is in any preselected ones of its rotational stations. To bring this about, normally de-actuated means are interconnected in the control system to modify the operation thereof, and a member indexed in step with the turret is caused to actuate the modifying means when the turret is at certain stations preselected or pre-programmed by the operator.

In the preferred embodiment here illustrated, all that is required is an electric switch and means to actuate it when the turret is in preselected stations, together with one or more auxiliary relays. As shown best in FIGS. 2, 3 and 4, an additional circular disk D–BF is mounted on the shaft 52 so as to be rotationally indexed in step with the turret 15 through the turret shaft 15a, the gears 37, 39 and the splined shaft 41. That backfeeding control disk, D–BF, is provided with means spaced about its periphery to receive projections which are positionable to actuate an electric switch DS–BF located physically in proximity to the disk. The projecting means may take a variety of forms so long as they are selectively movable between operative and inoperative positions. In one simple form, the disk D–BF is provided with a plurality of six holes *a-f* spaced around its periphery which are adapted to receive removable pins or screws 65. As shown in FIG. 4, the disk D–BF has been provided with two such projections 65 at the holes corresponding to turret stations *a* and *e*. When the turret is at corresponding rotational stations, therefore, the pins 65 will engage a finger 66 and depress the latter to actuate the backfeeding disk switch DS–BF. When a projection 65 has been provided on the disk D–BF to predetermine that backfeeding shall take place at a particular turret station, then the switch DS–BF will be actuated and will create a modification in the control apparatus which may now be described with reference to FIG. 8.

Referring to FIG. 8, let it be assumed that the backfeeding disk switch DS–BF is now actuated by a projection 65 on the associated disk D–BF. The operational cycle of the control equipment proceeds as previously described for the standard cycle. However, after the first dog 45 on the shaft 40 actuates the feeding control switch CS–FD, so that the rapid traverse relay RTR is de-energized, and the turret is advancing at a feed rate, the contacts RR1 and RTR2 will be closed. This completes an energizing circuit through the backfeed disk switch DS–BF to the coil of a backfeed relay BFR. Upon energization of that relay, its own contacts BFR1 close to create a sealing circuit through the normally closed contacts of the feeding control switch CS–FD. Also, pickup of the backfeed relay BFR results in opening of the normally closed contacts BFR2.

Then, when the turret has reached its point of maximum forward travel, the reversing control switch CS–R is actuated by a dog 49 on the shaft 40. This picks up and seals in the reverse relay RR, and energizes the time delay dwell relay TDR–D. Actuation of the latter's contacts TDR–D1 results in pickup of the dwell relay DR and closure of the contacts DR1. However, because the contacts BFR2 are now open, the raw valve solenoid S–RT will not be energized as previously described for the standard cycle of movement. Therefore, the rate valve 30 (FIG. 7) will continue to have its plunger 30a biased by the spring 30c into engagement with the stop screw 35. Any movement of the turret must proceed at a feed rate which is determined by that particular stop screw. Thus, with the de-energization of the forward solenoid S–F and energization of the reverse solenoid S–R, as previously described, the turret begins to retract, but at a feed rate rather than at a traverse rate.

As soon as the turret is retracted to the point at which the tool is clear of the work, i.e., to the point at which forward feeding was initiated, then the dog 45 on the shaft 40 will engage the roller 46 and actuate the feed control switch CS–FD (FIG. 2). Actuation of this switch, as shown in FIG. 8, will open its contacts and break the sealing energization circuit for the backfeed relay BFR. Accordingly, the contacts BFR2 will reclose and establish an energization circuit through the already closed contacts DR1 for the rate valve solenoid S–RT. Energization of this solenoid will reposition the plunger of the valve 30 (FIG. 7) to its wide-open position, so that further rearward movement of the turret will proceed at a traverse rate.

The cycles of operation will repeat over and over as previously described but the special cycle involved in backfeeding of the turret 15 will occur only when the latter is in those particular stations corresponding to the angular positions of the backfeeding disk D–BF which have been provided with projections 65 to actuate the backfeed switch DS–BF. With this arrangement, an operator of the turret lathe may pre-program the control equipment so that backfeeding will occur automatically at those particular stations which he selects by the insertion of the projections 65.

*Controls and Operation Producing a Floating Cycle for Thread Cutting*

When a given tool carried at one of the turret stations is a thread-cutting die, it is necessary that the die "thread itself" onto or into the work. Thus, it is not desired to forcibly and positively feed the turret toward the work held in the chuck 14, but only to supply enough force by means of the main hydraulic actuator 20 to overcome the inertia and frictional resistance to movement of the turret slide 16. For thread-cutting operations, therefore, the turret is made to "float" so that the die is not forced into or out of the work.

In keeping with another aspect of the invention, provision is made to modify the controls previously described so that a floating cycle of operation will take place whenever the turret is in any preselected one of its several stations. Normally deactuated means are interconnected with the control system such that when they are actuated by a member indexed in step with the turret, they will change the operational cycle previously described and cause the turret to "float" during those periods when it would otherwise, under a standard cycle of operation, be forcibly fed.

In the preferred form here shown, means are provided to reduce the output pressure of the source or pump 22 whenever feeding would otherwise be taking place during a standard cycle, so that the hydraulic actuator 20 receives only enough power to barely move the slide 16 and turret 15 toward or away from the work. As shown in FIG. 7, such pressure reducing means take the form of a normally closed restricting valve 70 having a plunger 70a with a passage therethrough. The plunger 70a is normally biased by a spring 70b out of alinement with ports in a casing 70c. The valve 70 is connected between the output side of pump 22 and the sump 24. Associated with that valve is a floating solenoid S–FL which when energized shifts the plunger 70a to the right against the biasing spring 70d, thus bringing the passage in the plunger into alinement with the casing ports and permitting fluid to pass thorugh the valve, so that the pressure on the output side of the pump 22 is considerably reduced.

In order to make it possible for an operator to preprogram or preselect a floating cycle of turret movement to occur when the turret is in any of its rotational stations, an additional disk D–FL is mounted on the sleeve 52 (FIG. 3) so as to be rotationally indexed in step with the turret 15. The disk D–FL is constructed in a manner substantially identical to that previously described for the backfeeding disk D–BF; it is provided with selectively positionable projections, such as the projections 65 in FIG. 4, which are arranged to acuate a floating disk switch DS–F (FIG. 2) disposed in physical proximity to that disk. Thus, an operator may by suitably positioning a number of projections on the periphery of the disk D–FL cause the floating disk switch DS–F to be actuated when the turret is at those particular stations for which a "floating" rather than a "standard" cycle of movement is desired.

The effect and the change in the operation of the control system which is brought about by the actuation of the floating disk switch DS–F may be understood with reference to FIG. 8. With the switch contacts DS–F closed in FIG. 8, the cycle of operation will proceed as previously described except that when the turret has rapidly advanced to the point at which the dog 45 on the shaft 40 actuates the feed control switch CS–FD (and thus causes the rapid traverse relay RTR to be de-energized), the contacts RTR2 will reclose and establish an energization circuit for a tapping relay TR through the contact RR1, RTR2 and DS–F. Pickup of the tapping relay TR will result in closure of its normally open contacts TR2 (at the bottom of FIG. 8), and thus in energization of the floating solenoid S–FL.

Energization of that solenoid, as previously explained in connection with FIG. 7, will shift the valve plunger 70a to a position which causes partial venting of the output of the pump 22 to the sump 44. Accordingly, the output pressure of the pump will be reduced and the piston 20b can be only urged with relatively small force in a forward direction. Thus the turret will "float" toward the work held by the chuck 14, rather than being forcibly fed as in the standard cycle previously described. The thread-cutting tool carried by the turret at that station will thus "thread itself" or pull itself into the work.

It may be assumed for the moment that the thread-cutting tool carried by the turret is an external thread-cutting die of the type which automatically opens or releases when it reaches the end of the shank to be threaded. When the turret has advanced to the end of the threading operation, the dog 49 on the shaft 40 will actuate the reversing control switch CS–R and will immediately energize the reversing relay RR, as previously described. This, in addition to setting the direction valve 26 in its reverse condition, and setting the rate valve 30 to its wide open or traverse condition, will result in opening of the normally closed contacts RR1 so that the tapping relay TR will be de-energized. Its contacts TR2 thus open to de-energize the solenoid S–FL, so that the valve 70 recloses and the full pressure of the pump 22 is again available to traverse the turret rearwardly.

In tapping holes or internal threads, however, it is necessary for the turret to both "float in" and "float out." For this operation, a manual selector switch MSS, located on the control cabinet 60 (FIG. 1) and connected in the circuit shown by FIG. 8, is closed. When the tapping relay TR is energized, as previously explained, its own contacts TR1 will close to create a sealing circuit through the normally closed feed control switch CS–FD and the manual selector switch MSS. Under these circumstances at the end of the "floating in" action and the tripping of the reversing control switch CS–R by the dog 49 on the shaft 40 which results in energization of the reversing relay RR, opening of the normally closed contacts RR1 will not de-energize the tapping relay TR. That tapping relay remain energized through the sealing circuit previously described. Accordingly, the output pressure of the pump 22 is maintained at a relatively low value so that as the turret begins its reverse movement, it receives a sufficient force from the actuator 20 only to overcome its inertia and friction. The die thus "floats out" of the work, the direction of rotation of the chuck 14 having been reversed by appropriate control means (not shown).

Then, when the turret has retracted to the point at which the "floating in" operation began, the dog 45 on the shaft 40 will again actuate the feed control switch CS–FD. As shown in FIG. 8, actuation of this latter switch interrupts the sealing circuit for the tapping relay TR so that the latter drops out, opening its contacts TR2 and de-energizing the solenoid S–FL. The valve 70 is thus reclosed so that the full output pressure of the pump 22 is again available to traverse the turret rearwardly to its home position.

Of course, as an incident to that full retraction of the turret, the turret is indexed and the floating control disk D–FL is correspondingly indexed. If no projection is at the next station on that disk to actuate the floating disk switch DS–F, then the next cycle of turret movement will proceed in the usual fashion.

*Reciprocating Cycle for Deep Hole Drilling*

In some instances it may be desirable to have the turret 15 carry a relatively small diameter bit for drilling relatively deep holes in a workpiece carried by the chuck 14. As relatively deep holes are drilled in a workpiece, it is desirable to retract the bit from the hole periodically to remove accumulated chips. Otherwise, the friction and heat may destroy or at least dull the bit. Yet, in periodically withdrawing the bit from a hole being drilled, it is desired to effect the withdrawal as rapidly as possible and to reinsert the bit at a rapid rate until it reaches the bottom of the partially drilled hole. The desired cycle of turret movement for deep hole drilling thus entails traversing the turret in a forward direction from its home position through a first predetermined distance to bring the bit up to the workpiece, feeding the bit into the workpiece for a short distance or for a short time interval, traversing the turret rearwardly until the bit just clears the workpiece, traversing the turret forwardly until the drill almost reaches the end of the partially completed hole, then feeding the turret forwardly for another short distance or time period. This reciprocation operation is repeated until the desired depth of hole is reached, i.e., the turret has been fed cumulatively through a second predetermined distance. After this, the turret should be rapidly retracted to its home position.

In accordance with an important feature of the invention, provision is made to so modify the controls previously described that such a reciprocating cycle for deep hole drilling takes place when the turret is in any preselected ones of its stations. To make this possible, only a relatively slight addition in the way of apparatus and control components is required, and yet the operator can pre-program the entire control system so that a reciprocating cycle is obtained automatically when the turret reaches any predetermined one or more of its rotational stations.

For effecting such a reciprocating cycle of turret movement, means such as a pull-out arm 75 is mounted for movement parallel to the path of the turret. As here shown in FIGS. 1, 2 and 6, the arm 75 takes the form of a hollow tube which is slidable longitudinally of the lathe bed 12 through the spaced brackets 44 and 48. Fixed near the forward end of the arm 75 is a yoke 76 to which a second guide shaft 77 may be fixed, the latter being slidable in a sleeve 78 extending between the brackets 44 and 48.

Means are provided for moving the arm forwardly in unison with the turret 15 as the latter advances when it is in any selected one or more of its rotational stations. For this purpose, a circular collar 80 is mounted rigidly on the forward end of the splined shaft 41 and provided with a plurality of circularly spaced openings 81 in its periphery. Means such as removable screws or pins 82 are adapted to be received selectively in the different openins 81. Since the collar 80 is rotationally indexed in step with the turret 15, insertion of a pin 82 in a particular one of the holes 81, will bring that pin into alinement with a finger 84 depending from the arm 75 whenever the turret is at a particular preselected one of its stations. With the pin 82 in the position illustrated by FIG. 6 as the turret advances in a forward direction, the pin will engage the finger 84 and pull the arm 75 forwardly with the turret.

To hold the arm 75 in a position which establishes the point of farthest advance of the turret even though the latter is retracted, means are provided to prevent rearward or reverse movement of the arm. For this purpose, a one-way brake device 85 is mounted in the bracket 48 and comprises a stationary sleeve 86 having a tapered throat 88. Disposed concentrically within the sleeve 86 is a carrier tube 89 formed at its forward end with a plurality of apertures which loosely hold captive a plurality of spherical elements or balls 90. The sleeve 89 is biased to the left relative to the throated member 86 by a compression spring 91, and slidably extends through the bracket 44. Thus, under normal conditions, the balls 90 are wedged tightly between the inner surface of the tapered throat 88 and the outer surface of the arm 75. The latter cannot move rearwardly (to the right) since that would wedge the balls 90 even more tightly in the tapered throat. However, the arm 75 can be pulled forwardly (to the left) because this tends to move the balls 90 into a wider portion of the tapered throat 88 so that they can spin freely.

For returning the arm 75 to its original position, an elongated tension spring 94 is disposed within its interior and connected at its rear end to the sleeve 89. Thus, as the arm 75 is pulled forwardly, the spring 94 is placed under tension, but cannot pull the arm 75 rearwardly because of the locking action of the one-way brake 85.

For releasing the brake and permitting the spring 94 to return the arm 75 all the way to its home position, a brake release solenoid S-BR is mounted on the bracket 44. That solenoid has an armature 95 disposed to deflect a lever 96 which will engage the right end of the sleeve 89 and shift the latter to the left against the bias of the spring 91. When the solenoid is energized, therefore, the sleeve 89 will shift to the right and move the balls 90 into a wider portion of the throat 88. Thus, the balls will lose their grip and the spring 94 can retract the arm 75 to its home position.

As an important part of the apparatus for modifying the control system to produce a reciprocating cycle of turret movement, a switch is arranged to be actuated when the turret is at preselected stations and is moving the arm 75 forwardly. As here shown, a pull-out control switch CS-PO is mounted on the yoke 76 and is arranged to be actuated when the pin 82 is engaging the finger 84. For this purpose, the finger 84 depends from a collar 84a which is slidably mounted on the arm 75. This collar 84a is normally biased to the right into abutment with the yoke 76 by a compression spring 98. However, as the pin 82 engages the finger 84, it shifts the collar 84a forwardly relative to the arm 75 so that the collar cams a finger associated with the switch CS-PO and actuates the latter. As the collar 84 advances further relative to the arm 75, it engages a thimble 99 rigidly fixed to the arm, and thus thereafter moves the arm forwardly in unison with the turret. By this arrangement a "lost motion" connection is established between the pin 82 and the arm 75, the switch CS-PO being actuated as soon as the pin 82 engages the finger 84 and the arm 75 being advanced only after the pin 82 moves forwardly a friction of an inch beyond that point of initial engagement.

It will be understood from the foregoing, therefore, when a reciprocating cycle for deep hole drilling is desired at a certain station of the turret, the operator pre-programs this by inserting one of the pins 82 into the corresponding hole 81 of the disk 80. When the turret is at the desired station, the pull-out arm 75 will be advanced with the turret but will remain at the point of farthest advance even though the turret subsequently retracts and the pin 82 retreats from the finger 84. However, when it is desired to return the arm 75 to its original position, the solenoid S-BR is energized to release the one-way brake 85 and permit the tension spring 84 to retract the arm 75. The switch CS-PO is actuated by the collar 84a whenever the pin 82 is engaged with the finger 84 and the turret is advancing in a forward direction.

With the foregoing in mind, the modified operation for producing a reciprocating cycle of turret movement may now be described with reference to FIG. 8.

The reciprocating cycle of turret movement begins in the same fashion as the standard cycle. The turret advances in a forward direction at a rapid traverse rate, the pin 82 in the collar 80 engaging the finger 84 so that the switch CS-PO is actuated and the sleeve 75 is moved forwardly in unison with the turret. During this initial rapid advance of the turret, this actuation of the pull-out control switch CS-PO does not energize the time delay reciprocation relay TDR-R (FIG. 8) because the rapid traverse relay RTR is energized and the contacts RTR2 are open. When the first dog 45 on the sleeve 40 actuates the feed control switch CS-FD, and thus causes de-energization of the rapid traverse relay RTR so that the contacts RTR2 reclose, the time delay relay TDR-R is energized through the actuated switch MS-PO as the forward feeding operation begins.

The purpose of the time delay relay TDR-R is to terminate forward feeding of the turret and initiate retraction of the tool at the end of a short time period. Thus, when the time delay relay TDR-R times out and picks up, its own contacts TDR-R1 close to create a sealing circuit through the normally closed feed control switch CS-FD. Moreover, its contacts TDR-R2 close to energize an auxiliary relay PR through the normally closed contacts RR4. Pick-up of the relay PR results in the opening of the normally closed contacts PR3 so that the forward solenoid S-F is de-energized after a predetermined time delay, and before the turret has advanced sufficiently to feed the drill bit fully into the work. Simultaneously, the relay contacts PR2 close so that the reverse solenoid S-R is energized through those contacts and the normally closed contacts RR4. Thus, after the turret has advanced for only a relatively short feeding period, its direction of motion is reversed in response to pick-up of the relay PR after timing out of the reciprocating time delay relay TDR-R.

Still further, pick-up of the relay PR results in closure of its contacts PR1 and energization of another auxiliary relay NR through the now closed contacts RR1 and RTR2. The relay NR seals-in around the contacts PR1 through its own normally open contacts NR1 and the normally closed contacts of the switch MS-PO. The latter is deactuated at this time because the turret is moving in a reverse direction so that the pin 82 (FIG. 6) has moved rearwardly away from the finger 84, the arm 75 being held at its point of farthest advance by the one-way brake device 85. Energization of the relay NR also results in closure of its contacts NR2 so that the rate valve solenoid S-RT is energized and the retraction proceeds at a rapid traverse rate rather than at feed rate.

With the slide thus being moved reversely at traverse rate, when the dog 45 on the shaft 40 actuates the control feed switch CS-FD (at the point at which the original feeding motion began, and thus at a point where the drill bit is clear of the work), the sealing circuit for the reciprocating time delay relay TDR-R will be broken. That is, the contacts CS-FD in series with the contacts TDR-R1 will open and immediately drop out the relay TDR-R. This results in opening of the contacts TDR-R2, and de-energization of the relay PR. With this, the contacts PR3 reclose to energize the forward solenoid F-S while the contacts PR2 open to de-energize the reverse solenoid S-R. Therefore, the valve 26 is set in its forward condition, and the turret moves forwardly, but at a rapid traverse rate since the solenoid S-RT continues to be energized through the now closed contacts NR2.

When the turret has almost reached the point of its previous farthest advance, that is, when the tip of the drill bit has almost reached the bottom of the partially drilled hole, the projection 82 will again engage the finger 84 and actuate the pull-out control switch CS-PO. This breaks the sealing circuit for the auxiliary relay NR, causing the latter to drop out so that its contacts NR2 open and de-energize the brake valve solenoid S-RT. This shifts the rate valve 30 to its partially closed condition and changes the turret movement from traverse to feed rate. As the tool advances another fraction of an inch, it contacts the work, begins drilling again with the turret being fed slowly into the work and the collar 84a abutting the thimble 99 to advance the arm 75 therewith.

It is to be remembered that when the switch MS-PO was actuated, it again established an energizing circuit for the time delay reciprocating relay TDR-R, so that the latter begins another timing cycle. After the forward feed and drilling for another predetermined period, the time delay TDR-R will actuate its contacts and the foregoing operation will be repeated. Therefore, the drill will be repetitively reciprocated into and out of the work, being retracted at rapid traverse, advanced at rapid traverse to a point almost at the bottom of the hole previously drilled, and then fed slowly for a predetermined period into the work.

Finally, when the drilling has proceeded to a predetermined depth established by the setting of the second dog 49 on the sleeve 40, that dog will actuate the reversing control switch CS-R. When this occurs, the reverse relay RR and the time delay dwell relay TDR-D will both be actuated. Accordingly, the contacts RR1 will open to make certain that the relays NR and TDR-R are both de-energized. Also, the contacts RR3 will reclose to energize the brake release solenoid S-BR, so that the pull-out arm 75 is returned to its home position by the spring 94. Drop out of the relays RR and TDR-D also produces a rapid retraction of the turret to its home position in the manner previously described for the standard cycle of turret movement.

It will be seen from the foregoing that the present control system for moving a lathe turret presents a high degree of versatility in that a standard cycle, a dwell cycle, a backfeed cycle, a floating cycle, or a reciprocating cycle of turret movement can be obtained. Moreover, any one of these cycles may be pre-programmed to occur at any one or more of the turret stations automatically. When the turret reaches a given station the operator need not interrupt the machine to make adjustments. All of this is done in advance. One important advantage of the present system is that the apparatus and control components for providing just a standard cycle of turret movement are fully utilized and only modified by appropriate interconnections in order to achieve the other special cycles of movements. Important, too, is the advantage that the dwell time period may be individually adjusted and preselected for each of the turret stations.

I claim:

1. For use on a lathe having a turret movable along a linear path, reversible power means for advancing and retracting the turret, and means for indexing the turret to successive ones of a plurality of rotational stations as an incident to retraction thereof, the combination comprising means for controlling said power means to cause the turret to execute a standard cycle of movement including advancing at traverse rate for a first predetermined distance, advancing at a feed rate for a second predetermined distance, and then fully retracting, normally ineffective means for modifying said controlling means to produce a dwell cycle, a backfeed cycle, a floating cycle, or a reciprocating cycle of turret movement, and means indexed with the turret selectively conditionable in advance for rendering any of said modifying means effective when the turret is at any selected station, so that any one of said five cycles of turret movement can be made to occur when the turret is in each of its indexed stations.

2. For use on a lathe having a turret movable along a linear path, reversible power means for advancing and retracting the turret, and means for indexing the turret to successive ones of a plurality of rotational stations as an incident to retraction thereof, the combination comprising means for controlling said power means to produce a standard cycle of turret movement, selectively actuatable means for modifying said controlling means to cause the latter to produce a backfeeding cycle of turret movement, selectively actuatable means for modifying said controlling means to cause the latter to produce a floating feed cycle of turret movement, selectively actuatable means for modifying said controlling means to cause the latter to produce a reciprocating drilling cycle of turret movement, and means indexed with the turret for actuating any one of said modifying means when the turret is in each of its rotational stations whereby the turret in each of its stations is automatically put through any selected one of the said four cycles of movement according to a predetermined program.

3. For use on a lathe having a turret movable along a linear path, reversible power means for advancing and retracting the turret, and means for indexing the turret to successive ones of a plurality of rotational stations as an incident to retraction thereof, the combination comprising means for controlling said power means to produce a standard cycle of turret movement; said controlling means including means for advancing the turret at traverse rate for a first predetermined distance, means for advancing the turret at feed rate for a second predetermined distance, and means for fully retracting the turret; selectively actuatable means including a first electric switch for modifying said controlling means to produce a backfeed cycle in which the turret retracts from its point of farthest advance through said second predetermined distance at the said feed rate, selectively actuatable means including a second electric switch for modifying said controlling means to produce a floating feed cycle in which said power means exerts only a small force on the turret during feeding thereof, selectively actuatable means including a third electric switch for modifying said controlling means to produce a reciprocating drilling cycle in which the turret is fed to successively more advanced points and partially retracted after each such feeding movement, and means connected with the turret to be indexed in step therewith for selectively actuating any of said switches when the turret is in any of its stations, so that any of said four turret cycles can be made to occur at each turret station.

4. For use on a lathe having a turret movable along a linear path, reversible power means for advancing and retracting the turret, and means for indexing the turret to successive ones of a plurality of rotational stations as an incident to retraction thereof, the combination comprising means for controlling said power means to produce a standard cycle of turret movement including electrically actuated reversing means, electrically actuated speed control means, and electrical circuits for energizing said last two means; means including a first normally deactuated electric switch connected in said circuits for modifying said controlling means to produce a backfeeding cycle of turret movement; means including a second normally deactuated electric switch connected in said circuits for modifying said controlling means to produce a floating feed cycle of turret movement; means including a third normally deactuated electric switch connected in said circuits for modifying said controlling means to produce a reciprocating drilling cycle of turret movement; three members adapted for connection with the turret to be indexed in step therewith; and means selectively positionable on said three members for actuating selectively any of said three switches when the turret is in any of its stations, so that any one of said four cycles of turret movement may be pre-programmed to occur when the turret is in any station.

5. For use on a lathe having a turret movable along a linear path, a reversible hydraulic actuator for advancing and retracting the turret, and means for indexing the turret to successive ones of a plurality of rotational stations as an incident to retraction thereof, the combination comprising a pressure fluid source and sump; a four-way reversing solenoid valve connecting said source and sump to the actuator; a normally open solenoid valve interposed in the connections to said actuator for creating a restriction to reduce the velocity of said actuator; control means including electrical circuits connected with the solenoids of said valves for producing a standard cycle of turret movement; said last-named means including means for setting said reversing valve in the advance condition to cause said actuator to advance the turret at a traverse rate, means for setting said normally open valve in a restricting condition after the turret has traversed a first predetermined distance so that the turret then advances at a feed rate, and means for setting said reversing valve in the retract condition and restoring said normally open valve after the turret has been fed a second predetermined distance so that the turret retracts at a traverse rate; first means for modifying said control means to produce a backfeeding cycle of turret movement; said first means including a first switch and means connecting it in said electrical circuits for preventing restoration of said normally open valve when said reversing valve is put into the retract condition until the turret has retracted at a feed rate through said second predetermined distance; second means for modifying said control means to produce a floating feed cycle of turret movement; said second means including a second switch and means responsive to actuation thereof for reducing the pressure output of said source for so long as said normally open valve is unrestored; third means for modifying said control means to produce a reciprocating drilling cycle of turret movement; said third means including an arm movable parallel to the path of the turret, a one-way brake connected to said arm to prevent retraction thereof, a third switch carried by said arm, and means responsive to actuation of said third switch after said normally open valve has been put into its restricting condition for putting said reversing valve in its retract condition and restoring said normally open valve until the turret retracts to the point at which traverse advance terminated; two members connectable with the turret to be indexed in step therewith; projecting means selectively positionable on said two members to actuate said first and second switches when the turret is in preselected ones of its stations; a third member connectable with the turret to be indexed and moved longitudinally therewith, and projecting means selectively positionable on said third member to actuate said third switch and pull out said arm as the turret advances when it is in preselected ones of its stations.

6. For use on a lathe having a turret movable along a linear path, reversible power means for advancing and retracting the turret, and means for indexing the turret to successive ones of a plurality of rotational stations as an incident to retraction thereof, the combination comprising means for controlling the power means to cause the turret to execute a standard cycle of movement including advancing at traverse rate for a first predetermined distance, advancing at a feed rate for a second predetermined distance, and then fully retracting at traverse rate; normally ineffective means for modifying said controlling means to produce a backfeeding cycle of turret movement in which the turret retracts at said feed rate over said second predetermined distance before fully retracting at traverse rate; and means indexed in step with the turret for rendering said modifying means effective when the turret is at any selected rotational station.

7. For use on a lathe having a turret movable along a linear path, reversible power means for advancing and retracting the turret, and means for indexing the turret to successive ones of a plurality of rotational stations as an incident to retraction thereof, the combination comprising means for controlling the power means to make the turret execute a standard cycle of movement, said controlling means including means for energizing said power means in an advancing direction and at traverse rate through a first predetermined distance, means for thereafter energizing said power means in the same direction at a feed rate through a second predetermined distance, and means for then energizing said power means in a retracted direction at traverse rate; means for modifying said controlling means to produce a backfeeding cycle of turret movement, said modifying means including normally ineffective means for causing said power means to move at a feed rate when it begins retracting until it retracts through said second predetermined distance, and means including a member indexed with the turret for rendering said normally ineffective means effective when the turret is in preselected ones of its rotational stations.

8. For use on a lathe having a turret movable along a linear path, a reversible hydraulic actuator for advancing and retracting the turret, and means for indexing the turret to successive ones of a plurality of rotational stations as an incident to retraction thereof, the combination comprising a pressure fluid source and sump, means including a solenoid operated reversing valve and a solenoid-operated rate valve connecting said actuator to said source and sump, said reversing valve having forward and reverse conditions to control the direction of turret movement, said rate valve having open and partially closed conditions to make the turret move at traverse and feed rates, respectively, means including electrical circuits connected with the solenoids of said valves for controlling said valves to produce a standard cycle of turret movement, said last-named means including means for setting said reversing valve in its forward condition and said rate valve in its open condition until it traverses a first predetermined distance, means for thereafter setting said rate valve in its partially closed condition until the turret feeds a second predetermined distance, and means for then setting said reversing valve in its reverse condition and said rate valve in its open condition until the turret fully retracts; means for modifying said controlling means to produce a backfeed of turret movement, said modifying means including ar normally deactuated switch connected in said electrical circuits for maintaining said rate valve in its partially closed condition when said reversing valve is set to its reverse condition and until the turret has fed reversely through said second predetermined distance, a member connectable to be rotationally indexed in step with the turret and located physically adjacent said switch, and means adapted to be carried in projecting relation by said member at preselected points thereon to actuate said switch when the turret is in preselected ones of its rotational stations.

9. For use on a lathe having a turret movable along a linear path, reversible power means for advancing and retracting the turret, and means for indexing the turret to successive ones of a plurality of rotational stations as an incident to retraction thereof, the combination comprising means for controlling the power means to cause the turret to execute a standard cycle of movement including advancing at traverse rate for a first predetermined distance, advancing at a feed rate for a second predetermined distance, and then fully retracting at traverse rate; a source of energy for said power means; normally ineffective means for modifying said controlling means to produce a floating cycle of turret movement; said modifying means including a normally deactuated electric switch and means responsive to actuation thereof for reducing the power output of said energy source so that said power means barely moves the turret when the latter is being fed, and means including a member rotationally indexed with the turret for actuating said switch when the turret is in preselected ones of its rotational stations.

10. For use on a lathe having a turret movable along a linear path, a reversible hydraulic actuator for advancing and retracting the turret, and means for indexing the turret to successive ones of a plurality of rotational stations as an incident to retraction thereof, the combination comprising a pressure fluid source and sump, means including a solenoid-operated reversing valve and a solenoid-operated rate valve connecting said actuator to said source and sump, said reversing valve having forward and reverse conditions to control the direction of turret movement, said rate valve having open and partially closed conditions to make the turret move at traverse and feed rates, respectively, means including electrical circuits connected with the solenoids of said valves for controlling said valves to produce a standard cycle of turret movement, said last-named means including means for setting said reversing valve in its forward condition and said rate valve in its open condition until it traverses a first predetermined distance, means for thereafter setting said rate valve in its partially closed condition until the turret feeds a second predetermined distance, and means for then setting said reversing valve in its reverse condition and said rate valve in its open condition until the turret fully retracts; means for modifying said controlling means to produce a floating cycle of turret movement, said modifying means including a normally deactuated switch connected in said electrical circuits, and means responsive to actuation of said switch for reducing the output pressure of said pressure source while said turret moves through said second predetermined distance; a disk indexed in step with said turret and disposed physically in proximity to said switch, and dogs selectively projectable from the periphery of said disk to actuate said switch when the turret is in preselected ones of its rotational stations.

11. The combination set forth in claim 10, further characterized in that said pressure reducing means includes means for reducing the output pressure of said source after said reversing valve has been set in its reverse condition and until the turret has retracted through said second predetermined distance.

12. For use on a lathe having a turret movable along a linear path, reversible power means for advancing and retracting the turret, and means for indexing the turret to successive ones of a plurality of rotational stations as an incident to retraction thereof, the combination comprising means for controlling said power means to make the turret execute a standard cycle of movement consisting of the steps of traversing forwardly to a first predetermined point, feeding forwardly to a second predetermined point, and then traversing reversely to the initial location; means for modifying said controlling means to produce a reciprocating drilling cycle of turret movement; said modifying means including an arm movable forwardly parallel to the path of the turret, means indexed with the turret for engaging and advancing the arm with the turret when the latter is in preselected ones of its rotational stations, means responsive to engagement of said indexed means with said arm for traversing the turret reversely after a predetermined period of forward feeding, means responsive to the turret moving reversely to said first predetermined point for traversing the turret forwardly until said indexed means engages said arm, and means responsive to such engagement for initiating forward feeding of the turret, and means responsive to the turret reaching said second predetermined point for (a) traversing the turret reversely to its beginning location and (b) returning said arm to its original position.

13. For use on a lathe having a turret movable along a linear path, reversible power means for advancing and retracting the turret, and means for indexing the turret to successive ones of a plurality of rotational stations as an incident to retraction thereof, the combination comprising means for controlling the power means to make the turret execute a standard cycle of movement, said controlling means including means for energizing said power means in a forward direction and at a traverse rate through a first predetermined distance, means for thereafter energizing said power means in the same direction and at a feed rate through a second predetermined distance, and means for then energizing said power means in a reverse direction and at a traverse rate; means for modifying said controlling means to produce a reciprocating drilling cycle of turret movement, said modifying means including an arm movable parallel to the path of the turret, brake means for preventing movement of said arm in a reverse direction means for engaging and advancing said arm with the turret when the latter is in preselected ones of its rotational stations, means responsive to such engagement with said arm for energizing said power means at traverse rates in a reverse direction a predetermined time after forward feeding begins and before the turret moves through said second predetermined distance, means for energizing said power means in a forward direction at traverse rate after the turret has retracted to the point marking the end of said first predetermined distance, means responsive to engagement of said advancing means with said arm to energize said power means in the same direction but at feed rate, and means responsive to the turret reaching the end of said second predetermined distance for (a) releasing said brake and retracting said arm and (b) energizing said power means to fully retract the turret at traverse rate.

14. For use on a lathe having a turret movable along a linear path, a reversible hydraulic actuator for advancing and retracting the turret, and means for indexing the turret to successive ones of a plurality of rotational stations as an incident to retraction thereof, the combination comprising a pressure fluid source and sump, means including a solenoid-operated reversing valve and a solenoid-operated rate valve connecting said actuator to said source and sump, said reversing valve having forward and reverse conditions to control the direction of turret movement, said rate valve having open and partially closed conditions to make the turret move at traverse and feed rates, respectively, means including electrical circuits connected with the solenoids of said valves for controlling said valves to produce a standard cycle of turret movement; said last-named means including means for setting said reversing valve in its forward condition and said rate valve in its open condition until it traverses a first predetermined distance, means for thereafter setting said rate valve in its partially closed condition until the turret feeds a second predetermined distance, and means for then setting said reversing valve in its reverse condition and said rate valve in its open condition until the turret fully retracts; means for modifying said controlling means to produce a reciprocating drilling cycle of turret movement, said modifying means comprising an arm movable parallel to the path of the turret, a one-way brake for preventing reverse movement of said arm, means biasing said arm in a reverse direction, a switch carried by said arm, a collar rotationally indexed and movable longitudinally with the turret, dogs positionable in collar to actuate said switch and advance said arm with the turret when the latter is in preselected ones of its rotational stations, means responsive to actuation of said switch to set said reversing valve to its reverse condition and set said rate valve to its open condition a predetermined time period after forward feeding of the turret begins, means responsive to the actuation of said switch to set said reversing valve in its forward condition when the turret retracts to the point marking the end of said first predetermined distance, means responsive to actuation of said switch for setting said rate valve to its partly closed condition for a predetermined time period, and means responsive to said turret finally reaching the end of said second predetermined distance for (a) setting said reversing valve to its reverse condition and said rate valve to its open condition so that the turret traverses reversely to its original position, and (b) releasing said brake so that said arm returns to its original position.

References Cited in the file of this patent

UNITED STATES PATENTS

| | | |
|---|---|---|
| 2,181,873 | Cregar | Dec. 5, 1939 |
| 2,401,276 | Schauer | May 28, 1946 |
| 2,551,517 | Webb | May 1, 1951 |
| 2,594,782 | Makant | Apr. 29, 1952 |
| 2,619,854 | Schurr | Dec. 2, 1952 |
| 2,642,649 | Shadrick | June 23, 1953 |
| 2,644,964 | Mackintosh | July 14, 1953 |
| 2,684,017 | Schafer | July 20, 1954 |
| 2,691,962 | Johnson | Oct. 19, 1954 |
| 2,736,296 | Romine | Feb. 28, 1956 |
| 2,758,570 | Liebmann | Aug. 14, 1956 |
| 2,768,539 | Wollenhaupt | Oct. 30, 1956 |
| 2,780,116 | Schafer | Feb. 5, 1957 |
| 2,791,135 | Twamley | May 7, 1957 |
| 2,816,462 | Babbitt | Dec. 17, 1957 |
| 2,839,896 | Koch | June 24, 1958 |